United States Patent [19]

Yamashita

[11] Patent Number: 4,607,298
[45] Date of Patent: Aug. 19, 1986

[54] APPARATUS FOR REPRODUCING MAGNETICALLY RECORDED VIDEO SIGNAL

[75] Inventor: Sachio Yamashita, Yamatokoriyama, Japan

[73] Assignee: Sanyo Electric Co., Ltd., Moriguchi, Japan

[21] Appl. No.: 699,628

[22] Filed: Feb. 8, 1985

[51] Int. Cl.⁴ ............................................. G11B 5/008
[52] U.S. Cl. ........................................ 360/73; 360/70; 360/77
[58] Field of Search ............................ 360/70, 73, 77

[56] References Cited

U.S. PATENT DOCUMENTS

| 4,297,733 | 10/1981 | Sanderson | 360/77 |
| 4,438,463 | 3/1984 | Sailamoto | 360/10.2 |
| 4,490,755 | 12/1984 | Tokuyama | 360/70 |
| 4,521,815 | 6/1985 | Tokuyama | 360/10.2 |
| 4,531,162 | 7/1985 | Tokumitsu | 360/10.3 |
| 4,542,424 | 9/1985 | Ishihara | 360/73 |

FOREIGN PATENT DOCUMENTS 19260 1/1984 Japan .

Primary Examiner—George G. Stellar
Attorney, Agent, or Firm—Armstrong, Nikaido, Marmelstein & Kubovcik

[57] ABSTRACT

An apparatus for reproducing a magnetically recorded video signal utilizes reproduced pilot signals not only for tracking control but also for detection of the recording mode of a signal being reproduced. More specifically, the above described video signal reproducing apparatus examines for a prescribed period a fundamental cycle of a comparing signal generated by reproduced pilot signals and reference signals mixed in the reproduced pilot signals so that the recording mode can be determined based on the number of times in which the fundamental cycle is repeated in the prescribed period. For the above described purposes, a pulse output corresponding to the fundamental cycle of a tracking signal is provided by using a level detecting circuit (30), a first differentiating circuit (31), a first frequency dividing circuit (33), a second differentiating circuit (34) and a flip-flop (32). The number of these pulses Q1 is counted by a counter (35) in a period determined by the second frequency dividing circuit (36) and selection of a recording mode is made based on the count value.

5 Claims, 11 Drawing Figures

FIG.1

| | $f_1$ | $f_2$ | $f_3$ | $f_4$ |
|---|---|---|---|---|
| $f_1$=102.6K | 0 | 16.5K | 62.8K | 46.2K |
| $f_2$=119.1K | 16.5K | 0 | 46.3K | 29.7K |
| $f_3$=165.4K | 62.8K | 46.3K | 0 | 16.6K |
| $f_4$=148.8K | 46.2K | 29.7K | 16.6K | 0 |

46 kHz   16 kHz

APPARATUS FOR REPRODUCING MAGNETICALLY RECORDED VIDEO SIGNAL

BACKGROUND OF THE INVENTION

1. Field of the Invention

This invention relates to an apparatus for reproducing a video signal which is recorded in one of a plurality of recording modes on a recording medium such as a magnetic tape, which can discriminate the recording mode automatically so as to change over the reproducing speed accordingly. More specifically, this invention relates to automatic discrimination of the recording mode in an apparatus of the so-called pilot signal system, in which a magnetic tape is used as a magnetic recording medium, and pilot signals for tracking control are recorded in the magnetic tape in superposition on the video signal, in place of tracks in which a tracking control signal is recorded.

2. Description of the Prior Art

A method of tracking control by the pilot signal system is proposed in the U.S. Pat. No. 4,297,733.

As a magnetic recording and reproducing apparatus employing the pilot signal system for tracking control, recently a small-sized magnetic recording and reproducing apparatus called "8 mm VIDEO" is attracting a keen attention. This small-sized magnetic recording and reproducing apparatus includes a standard recording mode and a standard reproducing mode at a standardized playing tape speed, and a long playing recording mode and a long playing reproducing mode at a half of the standard playing tape speed for long-term recording and reproducing. Accordingly, in reproducing, it is necessary to discriminate at which recording mode the video signal has been recorded.

In a VHS type magnetic recording and reproducing apparatus or a Beta type magnetic recording and reproducing apparatus presently available on market, the recording mode is discriminated by a reproduced control signal for tracking control which is detected from the control track in the magnetic tape, and the reproducing speed is automatically changed over.

However, in the 8 mm VIDEO employing the pilot signal system for tracking control, a magnetic tape does not have control track. Therefore, in order to discriminate the recording mode automatically, it is necessary to provide a new circuit not relying on a reproduced control signal.

An example of system for determining a recording speed of a magnetic tape which a video tape recorder of the pilot signal system is in a reproducing mode, which has close relation with the present invention, is shown in Japanese Patent Laying-Open Gazette No. 19260/1984. However, the determining system disclosed in this gazette involves disadvantages that when an erroneous frequency is detected, even if instantaneously, due to noises and the like, the determining circuit is switched on, causing errors in the detection of the recording mode.

SUMMARY OF THE INVENTION

The present invention aims to provide a video signal reproducing apparatus for making tracking control at the time of reproduction by the pilot signal system, in which a recording mode can be automatically determined using pilot signals for tracking.

Briefly stated, a video signal reproducing apparatus in accordance with the present invention examines in a prescribed period of time a fundamental cycle of a tracking signal to determine a recording mode based on the number of times the fundamental cycle is repeated in the prescribed period of time, the tracking signal being provided by reproduced pilot signals and reference signals mixed in the reproduced pilot signals in a manner in which the frequency of the respective reference signals and the order of selection thereof correspond to those of the pilot signals.

According to the present invention, a recording speed can be accurately determined with a simple structure in which a fundamental frequency of a tracking signal provided by reproduced pilot signals and reference signals is counted in a prescribed period of time. In addition, in an apparatus in accordance with the present invention, erroneous operation will never occur due to noises and the like since the fundamental frequency of a tracking signal is continuously counted in a prescribed period of time.

These objects and other objects, features, aspects and advantages of the present invention will become more apparent from the following detailed description of the present invention when taken in connection with the accompanying drawings.

DESCRIPTION OF THE PREFERRED EMBODIMENTS

(1) Outline of 8 mm VTR

One of the embodiments of the present invention is described hereunder taking the case of the 8 mm VTR (Video Tape Recorder).

The 8 mm VTR is a recording and reproducing apparatus wherein an 8 mm wide magnetic tape for recording a video signal is used, a cassette of which is approximately the same as the size of an audio compact cassette, and is so called by the press because it is comparable to an 8 mm movie camera.

In the 8 mm VTR, four kinds of pilot signals $f_1$, $f_2$, $f_3$, $f_4$ for tracking different in their frequencies are used for tracking control. The pilot signals $f_1$ to $f_4$ are changed over cyclically for each field period, and are superposed and recorded onto a video track and a PCM track.

Figure 1:
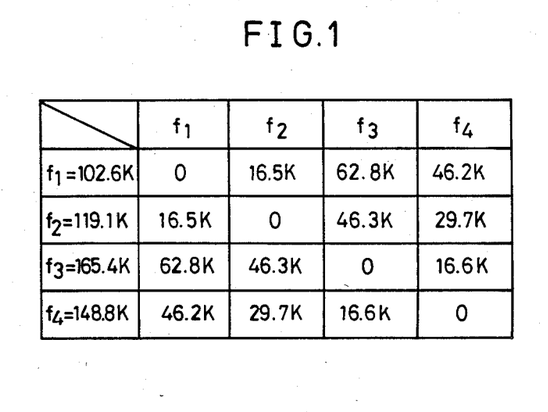
FIG. 1 is a diagram for explaining the frequency of a beat signal caused by the frequencies of the pilot signals for tracking.

Referring to FIG. 1, the frequencies of the pilot signals are selected at 102.544 kHz for the first signal $f_1$, 118.951 kHz for the second signal $f_2$, 165.210 kHz for the third signal $f_3$, and 148.689 kHz for the fourth signal $f_4$, respectively. On the video track, the pilot signals are recorded in a specified order so that the difference in frequency from the pilot signal of the adjacent tracks may be approximately 16 kHz on the one side and approximately 46 kHz on the other side.

Tracking control at the time of reproducing mode is performed in the following manner. While the reproducing track is being traced by the reproducing heads, the pilot signals recorded at both tracks adjacent to both sides of the track being traced are also somewhat read by the side read effect of the reproducing heads. For example, when the pilot signal $f_1$ is recorded in the reproducing track, the pilot signals $f_4$, $f_2$ recorded in both side adjacent tracks are read out in addition to the pilot signal $f_1$. A reference signal $f_1$ having a frequency coinciding with the first pilot signal $f_1$ is mixed with the pilot signals being read out. As a result, the 46 kHz beat signal and the 16 kHz beat signal are generated due to the reference signal $f_1$ and the pilot signals $f_4$, $f_2$ as the crosstalk components from the adjacent tracks. Accordingly, a tracking error can be detected by comparing the levels of the 46 kHz beat signal and the 16 kHz beat signal. More specifically, as far as the reproducing heads are tracing the predetermined tracks exactly, the levels of the crosstalk pilot signals being read out from both sides tracks are equal to each other, so that the levels of the 46 kHz beat signal obtained by mixing a crosstalk pilot signal and the reference signal and the 16 kHz beat signal obtained by mixing another crosstalk pilot signal and the reference signal are equal to each other. On the other hand, when the reproducing heads are deviated to either track side, the level balance of the beat signals is lost so that a tracking error may be detected.

(2) Explanation of the principle of recording mode determination

In the following, the principle of determination of a recording mode which is applied to this embodiment will be described.

Figure 2:
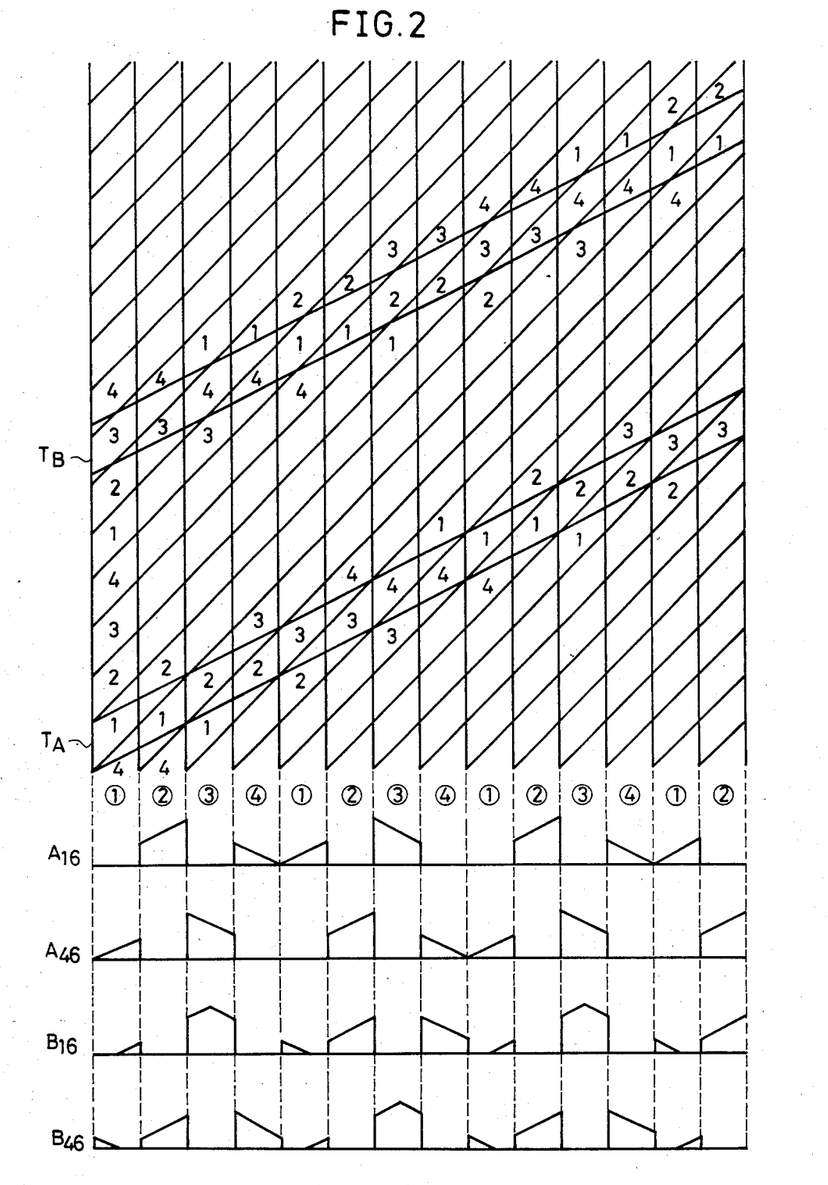
FIG. 2 is a diagram showing scanning traces of heads and changes in the output level of two tracking signals generated when a video tape with a video signal recorded in a standard recording mode is reproduced in a long playing reproducing mode.
Figure 3:
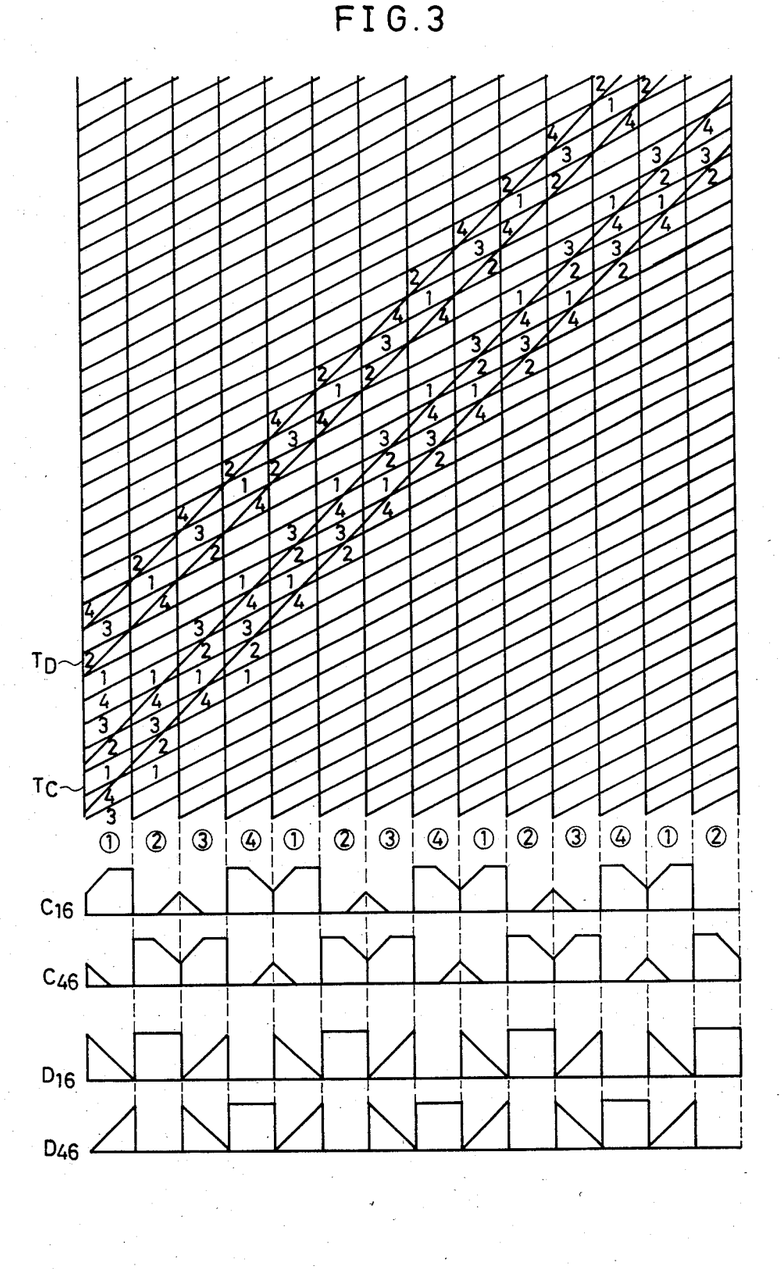
FIG. 3 is a diagram showing scanning traces of heads and changes in the output level of two tracking signals generated when a video tape with a video signal recorded in a long playing recording mode is reproduced in a standard reproducing mode.
Figure 4:
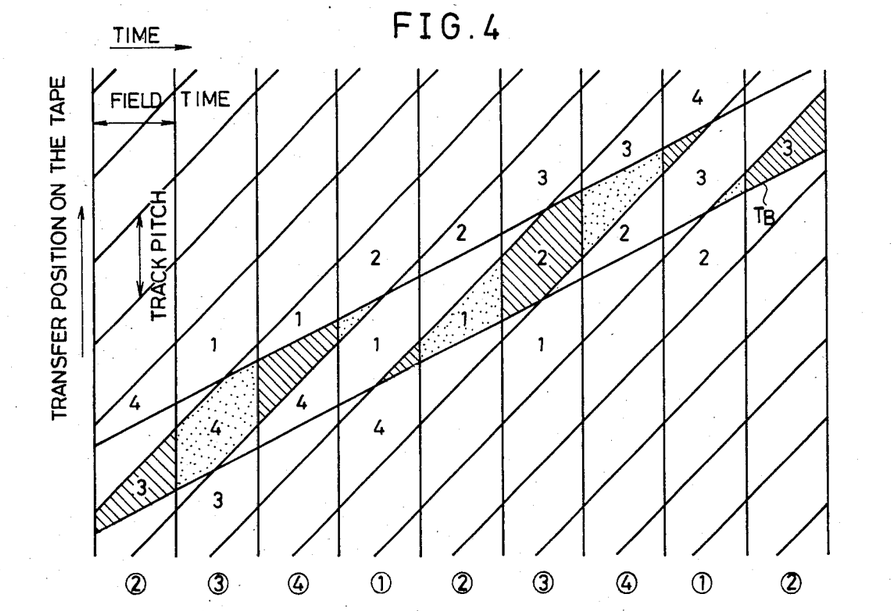
FIGS. 4 and 5 are diagrams showing in an enlarged manner track patterns corresponding to FIGS. 2 and 3, respectively.
Figure 5:
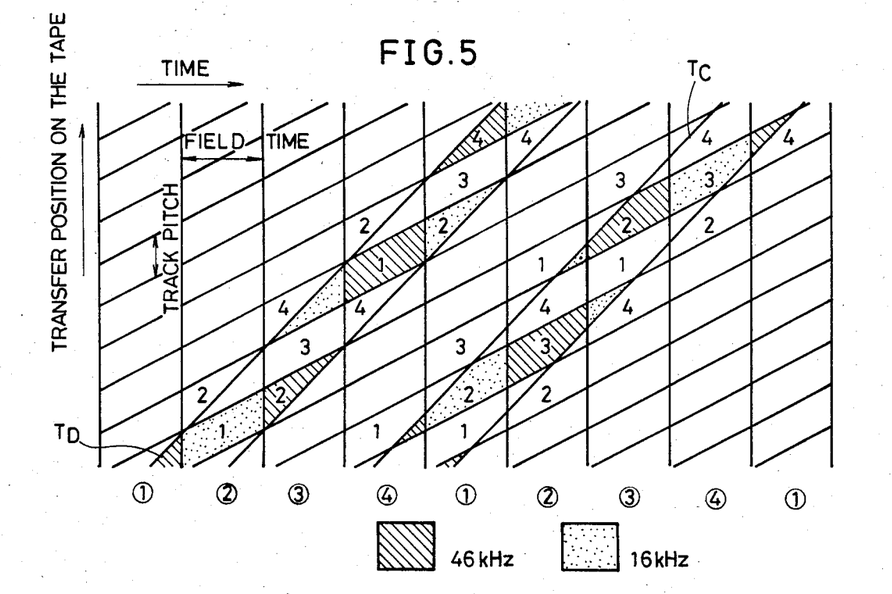

FIG. 2 is a diagram showing track patterns and scanning traces of heads as well as a change of the output level of each beat signals generated in case where a video tape with a video signal recorded in the standard recording mode is reproduced in the long playing reproducing mode; and FIG. 3 is a diagram showing track patterns and scanning traces of heads as well as a change of the output level of each of beat signals generated in case where a video tape with signals recorded in the long playing recording mode is reproduced in the standard reproducing mode. FIGS. 4 and 5 are diagrams showing in an enlarged manner track patterns corresponding to FIGS. 2 and 3, respectively. In FIGS. 2 to 5, the numerals 1 to 4 on the respective track patterns denote the type of pilot signals recorded at the tracks respectively and the numerals 1 to 4 circled under the track patterns denote the type of reference signals mixed in the pilot signals reproduced from the respective tracks. In addition, in FIGS. 4 and 5, hatched regions represent regions where a beat signal of 46.2 kHz is generated and dotted regions represent regions where a beat signal of 16.5 kHz is generated.

The track patterns in FIGS. 2 to 5 are drawn in a manner different from the representing method conventionally employed as recording patterns on the tape of a video tape recorder of the helical scan system. This track pattern representing method is called as "the track pattern coordinate method". This method of representation was proposed by Nobuyoshi Kobori et al. in the "National Technical Report," Vol. 28, No. 3, June 1982.

In the track pattern cordinate method, vertical lines indicate the tapes and the tapes in longitudinal direction are placed side by side in transversal direction. The track patterns drawn on the tapes inclined upward to the right are slipped off by one track pitch as tapes are moved from left to right. By this coordinate method, therefore, the track patterns and the head scanning traces can be taken as the locus of continuous lines. Moreover, the time and the head transfer on the tape can be known at a glance because the abscissa indicates time and the ordinate shows transfer position on the tape.

Now, a detailed description will be made with reference to the drawings. Referring to FIGS. 2 and 4, when a tape with a standard recording mode is reproduced in a long playing reproducing mode, video heads scan a trace as shown as $T_A$ or $T_B$ for example. In case where the video heads scan the trace $T_A$, when reference signals 1 to 4 are successively selected and fed into pilot signals reproduced in this case in response to a head selection signal, a beat signal of 16 kHz and a beat signal of 46 kHz are generated as a result of the difference between the frequencies of the reproduced pilot signals and the reference signals. More specifically, a beat signal of 46 kHz is generated by feeding of a reference signal into a pilot signal reproduced from the hatched regions in FIG. 4 and a beat signal of 16 kHz is generated by feeding of a reference signal into a pilot signal reproduced from the dotted regions in FIG. 4. These beat signals are represented as the output waveforms of $A_{16}$ and $A_{46}$, respectively. In the same manner, in case of reproduction along the scanning trace $T_B$ of the video heads, beat signals generated in this case have output levels of $B_{16}$ and $B_{46}$.

Similarly, in case where a tape with the long playing recording mode is reproduced in the standard reproducing mode, the head scanning trace and the beat signals are changed as shown in FIGS. 3 and 5. As can be seen from FIGS. 3 and 5, when reproduction is made along the scanning trace $T_C$ or $T_D$ and reference signals are selected as shown as 1 to 4 to be fed into the reproduced pilot signals, beat signals as described below are obtained. In case of the scanning trace $T_C$, a beat signal of 16 kHz represented as $C_{16}$ and a beat signal of 46 kHz represented as $C_{46}$ are obtained according to the change as shown in FIG. 5. Also in case of the scanning trace $T_D$, a beat signal of 16 kHz and a beat signal of 46 kHz are obtained as shown as $D_{16}$ and $D_{46}$, respectively.

Figure 6:
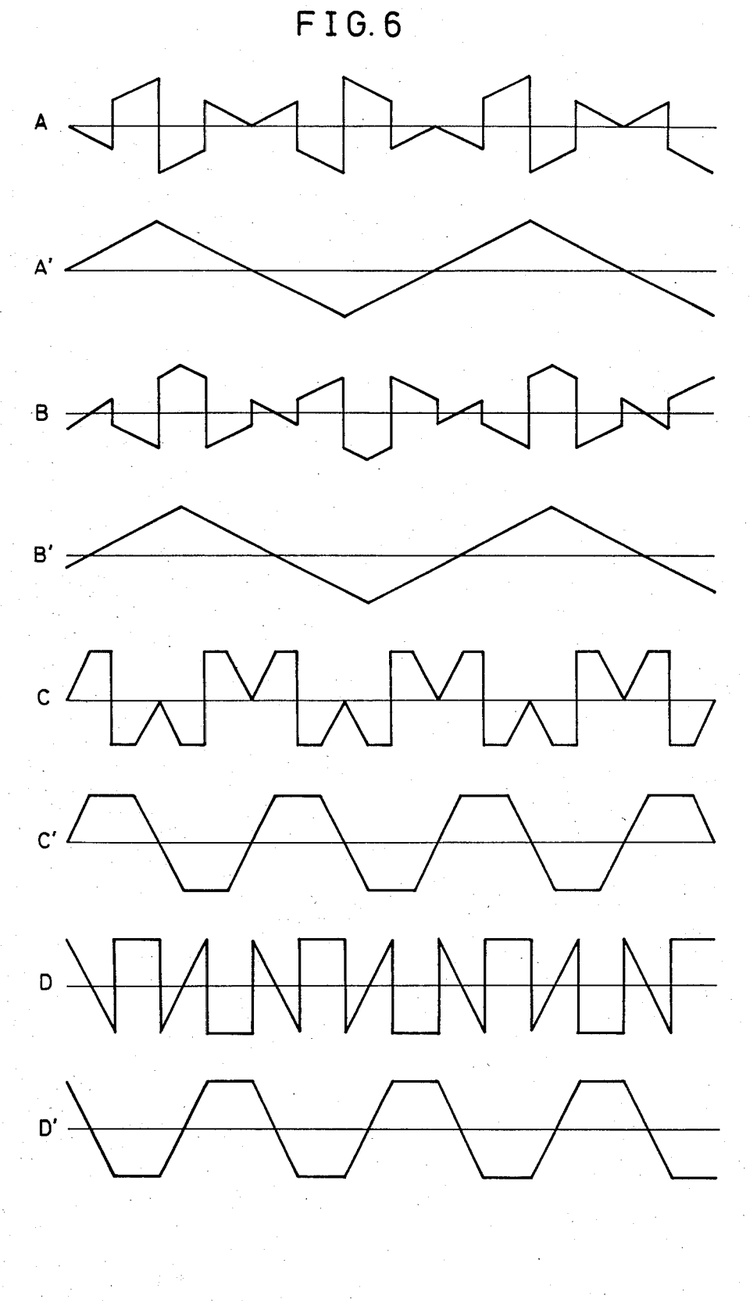
FIG. 6 is a waveform diagram showing tracking signal output waveforms and the reversed waveforms thereof for every two fields.

If the outputs $A_{46}$, $B_{46}$, $C_{46}$ and $D_{46}$ of the 46 kHz beat signals are compared, respectively, with the outputs $A_{16}$, $B_{16}$, $C_{16}$ and $D_{16}$ of the 16 kHz beat signals corresponding to the scanning traces $T_A$, $T_B$, $T_C$ and $T_D$, the respective waveforms of the outputs of comparison are as shown as A, B, C and D in FIG. 6. In addition, when the compared output waveforms A, B, C and D are reversed respectively for a field cycle, the tracking signals which are reversed have waveforms as shown as A', B', C' and D' in FIG. 6.

When the standard recording mode tape is reproduced in the long playing reproducing mode from the reversed output waveforms A' and B', it can be seen that the reversed outputs A' and B' thus processed by comparison and reversion change by a cycle of 8 fields. When the long playing recording mode tape is reproduced in the standard reproducing mode, it can be seen that the reversed outputs C' and D' thus processed by comparison and reversion change by a cycle of 4 fields.

This embodiment makes it possible to determine a recording speed or mode of a tape by examining the difference of the cycles of the thus processed outputs of the tracking signals.

Figure 7:
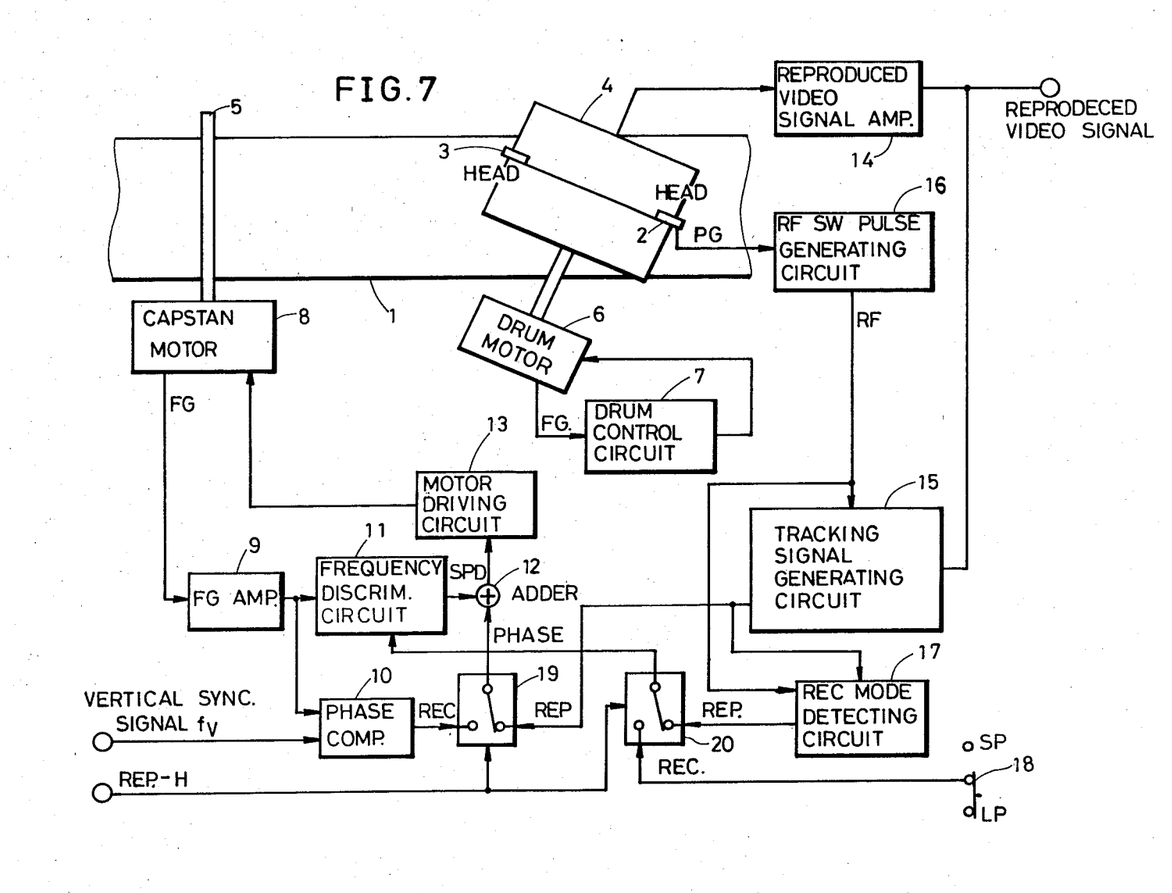
FIG. 7 is a block diagram of a servo circuit system of an 8 mm video tape recorder of an embodiment in accordance with the present invention.

(3) Description of Practical Circuit Blocks (3-a) Description of servo circuit system block diagram:

FIG. 7 is a servo circuit system block diagram of the 8 mm VTR to which one of the embodiments of this invention is designated. This 8 mm VTR can record and reproduce both in the standard mode and in the long playing mode. In the long playing mode, the transfer speed of the video tape is half that in the standard mode.

Referring to FIG. 7, a video tape 1 is helically wound on a rotating drum 4 on which heads 2, 3 are mounted, and is transferred at a constant speed by means of a capstan 5.

The rotating drum 4 is driven by a drum motor 6, and this drum motor 6 is controlled by a drum control circuit 7.

The capstan 5 is rotated by a capstan motor 8. The rotation of the capstan motor 8 is controlled in the manner to be described subsequently. That is, a rotation detecting pulse FG generated by the capstan motor 8 is amplified by a rotation detecting pulse amplifying circuit 9 and is applied to a phase comparator 10 and a frequency discriminating circuit 11. The phase comparator 10 compares the phases of the vertical synchronizing signal $f_V$ separated from the video signal to be recorded at the time of recording and the rotation detecting pulse FG. The frequency discriminating circuit 11 detects the speed from a period of the rotation detection pulse FG. The output from the comparator 10 and the output from the frequency discriminating circuit 11 are added in an adder 12, and the combined output of the adder 12 is applied to a motor driving circuit 13 as a control signal, so that the rotation of the capstan motor 8 is controlled at a predetermined constant speed by the circuit 13.

The signal reproduced by the heads 2, 3 is amplified by a reproduced video signal amplifying circuit 14 and is output to the output terminal as a reproduced video signal, while it is also applied to a reproducing capstan phase error signal detecting circuit 15. Besides, in response to the changeover of the heads 2, 3, a reference switching pulse RF is generated in a reference switching pulse generating circuit 16. In the tracking signal generating circuit 15, which is a popular circuit, the tracking signal based on these two inputs is applied to the adder 12 at the time of reproducing. The recording mode detecting circuit 17 to which the reference switching pulse RF and the tracking signal are applied detects the recording mode.

In the reproducing mode, the output of the error signal detecting circuit 15 is applied to the adder 12 via a switch 19. The output of the recording mode detecting circuit 17 is applied to the frequency discriminating circuit 11 through a switch 20 in the reproducing mode. A speed signal is provided based on the rotation detecting pulse FG and the recording mode detecting output in the discriminating circuit 11 and the signal is applied to the adder 12. The adder is responsive to those two input signals to provide a motor control signal. This control signal is applied to the motor driving circuit 13.

Referring to FIG. 7, the reference code REP-H is a signal output by the manual changeover switch which becomes the high level in the reproduction mode. A switch 18 is a manual switch for selecting either the standard mode or the long playing mode in recording.

(3-b) Explanation of a Block Diagram of a Recording Mode Determining Circuit

Figure 8:
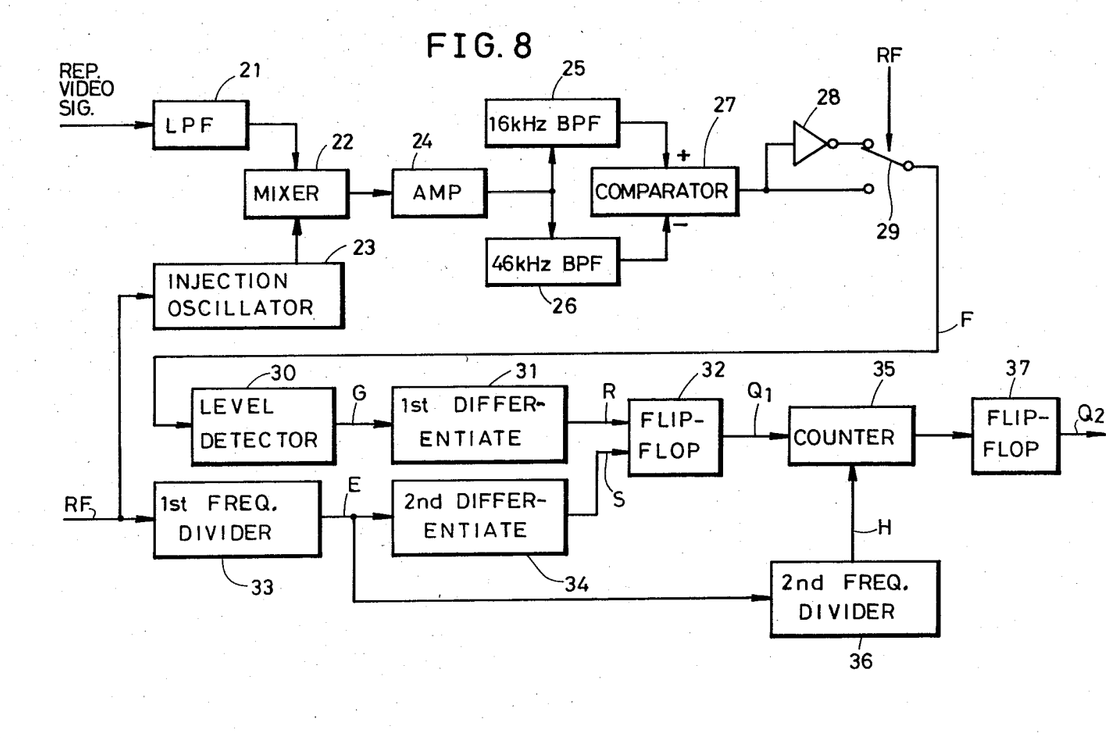
FIG. 8 is a circuit block diagram showing a portion which constitutes a distinctive feature of an embodiment of the present invention.
Figure 9:
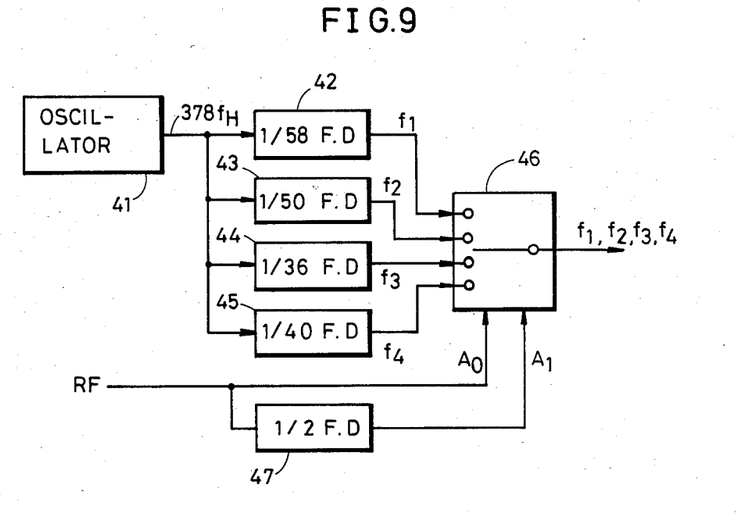
FIG. 9 is a detailed block diagram of an injection oscillating circuit.
Figure 10:
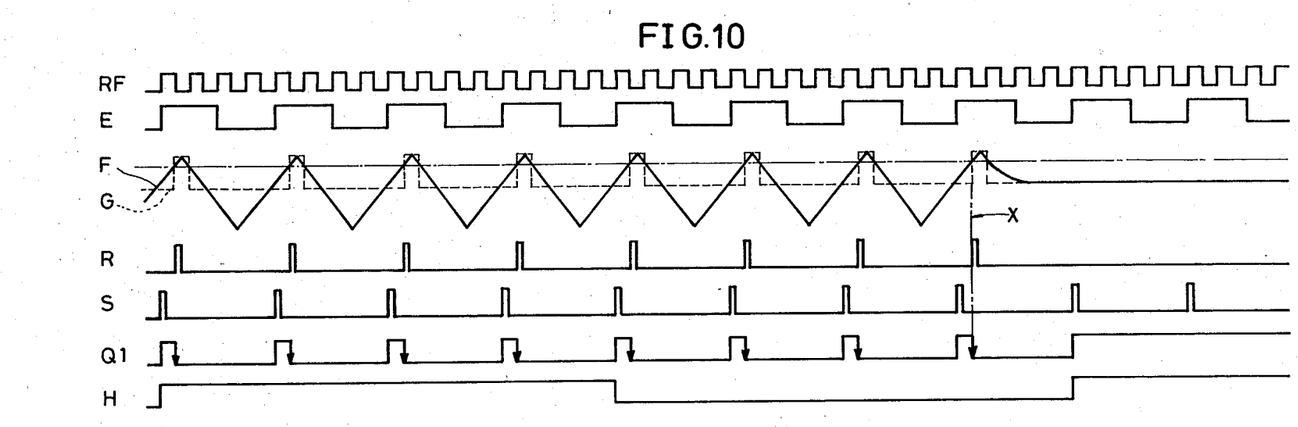
FIG. 10 is a signal waveform diagram in a long playing reproducing mode.
Figure 11:
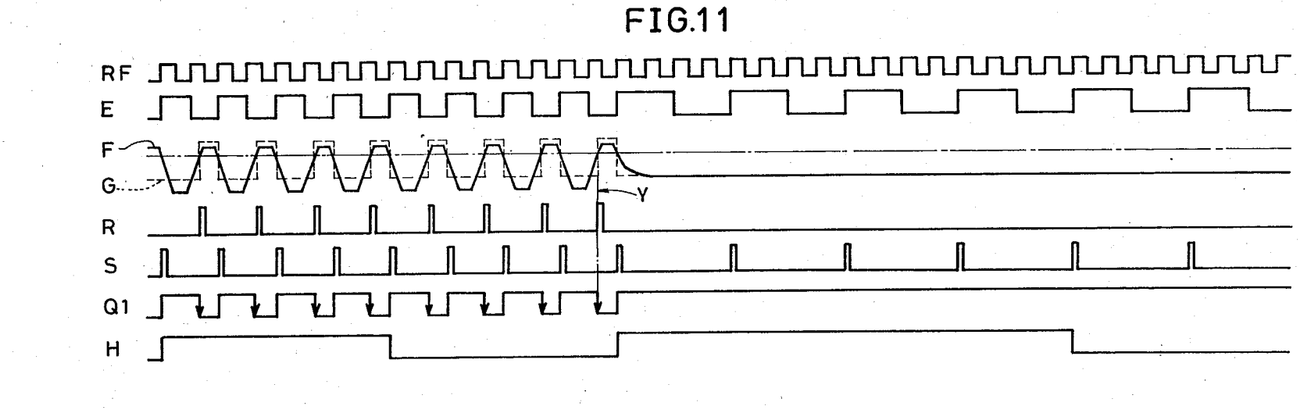
FIG. 11 is a signal waveform diagram in a standard reproducing mode.

FIG. 8 is a block diagram of a circuit structure which constitutes a distinctive feature of this embodiment. The block diagram in FIG. 8 represents in detail the reproduction capstan phase error signal detecting circuit 15 and the recording mode detecting circuit 16 shown in FIG. 7. FIG. 9 is a block diagram showing an example of a concrete structure of the injection oscillating circuit 23 shown in FIG. 8. FIGS. 10 and 11 are waveform diagrams of the signals provided from the specified circuits shown in FIGS. 8 and 9. FIGS. 10 and 11 show respectively a waveform obtained at the time of reproducing a standard recording mode tape in the long playing reproducing mode and a waveform obtained at the time of reproducing a long play recording mode tape in the standard reproducing mode. Referring to FIGS. 8 to 11, the structure and the operation shown in FIGS. 8 and 9 will be described.

Referring to FIG. 8, the low-pass filter 21 to which a reproduced video signal is applied provides a reproduced pilot signal containing a crosstalk component. The output of the low-pass filter 21 is supplied to the mixer 22 in the subsequent stage so as to be mixed with the output of the injection oscillating circuit 23. The injection oscillating circuit 23 is a circuit for changing the division ratio of the oscillation frequency by a field cycle in response to a reference switching pulse RF. The injection oscillating circuit 23 selects reference signals $f_1$ to $f_4$ having frequencies respectively identical to those of the four tracking pilot signals $f_1$ to $f_4$ in the same order as for selection of the above described pilot signals so that these reference signals are provided as output successively.

Referring to FIG. 9, the oscillating circuit 41 provides an output of 378 $f_H$ ($f_H$ being a horizontal synchronizing frequency of a video signal). The output of 378 $f_H$ undergoes frequency division in the 1/58 frequency divider 42, the 1/50 frequency divider 43, the 1/36 frequency divider 44 and the 1/40 frequency divider 45, from which a first frequency signal $f_1$, a second frequency signal $f_2$, a third frequency signal $f_3$ and a fourth frequency signal $f_4$, respectively, are supplied to the switching circuit 46.

On the other hand, the reference switching pulse RF is ½ frequency divided directly by the ½ frequency divider 47, from which selection timing signals $A_0$ and $A_1$ are supplied to the switching circuit 46. In the switching circuit 46, switching is made based on the selection signals $A_0$ and $A_1$ so that reference signals $f_1$ to $f_4$ are provided successively. Relations between the states of the selection signals $A_0$ and $A_1$ supplied to the switching circuit 46 and the switching outputs $f_1$ to $f_4$ are as shown in the following table.

TABLE

| A0 | A1 | Output |
|----|----|--------|
| 1  | 1  | f1     |
| 0  | 1  | f2     |
| 1  | 0  | f3     |
| 0  | 0  | f4     |

Referring again to FIG. 8, the output of the mixer circuit 22 is amplified in the amplifying circuit 24 so as to be supplied to the 16 kHz bandpass filter 25 having a center frequency set to 16 kHz and provided with a detecting function as well as to the 46 kHz bandpass filter 26 having a center frequency set to 46 kHz and provided with a detecting function. From the 16 kHz bandpass filter 25, a beat signal of 16 kHz is provided and from the 46 kHz bandpass filter 26, a beat signal of 46 kHz is provided.

These output signals are supplied to the subsequent comparator circuit 27, where the beat signal of 46 kHz is compared with the beat signal of 16 kHz. The output from the comparator 27 is supplied to the inverter 28 in the subsequent stage. The output of the inverter 28 and the output directly provided from the comparator 27 are selected by the analog switch 29. The analog switch 29 makes selection in response to the reference switching pulse RF. Accordingly, the analog switch 29 is turned on oppositely for each field and a tracking signal F provided through the switch 29 has a waveform F as shown in FIGS. 10 or 11. The waveform F is equivalent to the waveform of the tracking signals A', B', C' or D' processed by comparison and reversion as described above with reference to FIG. 6.

The tracking signal F thus processed is supplied to the level detecting circuit 30 having a prescribed threshold level, where the signal is sampled and held by making comparison with the prescribed threshold level so that it is converted to a two-value signal G as shown in FIG. 10. The two-value signal G thus detected is differentiated in the subsequent first differentiating circuit 31 so that a differentiated output R synchronizing with the rise thereof is obtained. The differentiated output R is supplied to the flip-flop 32 as a reset signal R.

On the other hand, as shown in FIGS. 10 or 11, the reference switching pulse RF of a frame cycle reversing for each field is frequency divided in the first frequency dividing circuit 33 (FIG. 8). The first frequency dividing circuit 33 is a circuit capable of selecting a frequency division value of ¼ or ½ corresponding to the reproducing mode employed at present.

Now, assuming that reproduction is made in the long playing reproducing mode, the frequency division value of the first frequency dividing circuit 33 is set to ¼. Accordingly, the output E thereof becomes a signal having a cycle of 8 fields as shown in FIG. 10. This output E is differentiated in the second differentiating circuit 34, which provides a pulse of a 8-field cycle as shown as S in FIG. 10. This pulse is supplied to the flip-flop 32 as a set signal S. Accordingly, when a tape with a standard recording pattern is reproduced in the long playing reproducing mode, setting and resetting of the flip-flop 32 are repeated alternately for every 8 fields and an output Q1 as shown in FIG. 10 is provided.

The counter 35 to which the output Q1 from the flip-flop 32 is supplied is the counter 35 for generating a carry pulse formed of three bits. More specifically, the counter 35 provides a carry pulse in response to the eighth output Q1 supplied from the flip-flop 32 so that the carry pulse is applied to a set terminal of the flip-flop 37.

On the other hand, a signal H is supplied to the counter 35 as a reset signal. The signal H is a signal obtained when the output E of the first frequency dividing circuit 33 is frequency divided in the second frequency dividing circuit 36. The second frequency dividing circuit 36 is a ½ fixed frequency dividing circuit. Accordingly, the output H is a signal of a 64-field cycle as shown in FIG. 10 during reproduction in the long playing reproducing mode and a signal of a 32-field cycle as shown in FIG. 11 during reproduction in the standard reproducing mode.

In consequence, if a tape with a standard recording pattern is reproduced in the long playing reproducing mode, the counter 35 counts eight output pulses Q1 provided from the flip-flop 32 until the counter 35 is reset at the rise of the reset signal H of the 64-field cycle and as a result the carry pulse from the counter 35 is supplied to the flip-flop 37 at the point X as shown in FIG. 10. Accordingly, if the frequency determining circuit 11 shown in FIG. 7 is enabled to make selection in response to the high level of the output Q2 of the flip-flop 37, a change from the long playing reproducing mode to the standard reproducing mode coincident with the recording pattern can be made automatically.

On the contrary, if a tape with the long playing recording mode is reproduced in the standard reproducing mode, the output E of the first frequency dividing circuit 33 becomes a pulse of a 4-field cycle as shown in FIG. 11 and the flip-flop 32 is set and reset by the 4-field cycle and the output Q1 therefrom is provided by the 4-field cycle. Until the counter 35 is reset by the 32-field cycle at the rise of the reset signal H from the second frequency dividing circuit 36, the counter 35 counts eight output pulses Q1 from the flip-flop 32 and then provides a carry pulse at the point Y as shown in FIG. 11. The carry pulse is maintained in the flip-flop 32 and is supplied as a reproducing mode selecting signal. As a result, the rotational speed of the capstan motor (see FIG. 7) is changed to be reduced to half so that the reproducing mode coincident with the recording mode can be selected.

Needless to say, if the recording mode and the reproducing mode are coincident, the tracking signal F is not generated and the output Q1 of the flip-flop 32 is always in the high level and the counter 35 does not perform counting operation.

As described in the foregoing, in this embodiment, the counter 35 counts the number of output pulses Q1 provided from the flip-flop 32 based on the fundamental cycle of the comparing signal in a given period till the counter 35 is reset by the output H of the second frequency dividing circuit 36. Accordingly, an apparatus of this embodiment is capable of making accurate determination without being affected by an instantaneously generated abnormal signal and the like due to noises etc.

Although in the above embodiment, a structure was adopted in which output from the counter 35 is not provided if the number of output pulses Q1 counted by the counter 35 in a prescribed period before resetting thereof is short by even one pulse, the present invention may also be structured such that a prescribed period till the counter 35 is reset is made long to allow a margin for the number of pulses Q1 to be counted in this period. More specifically, in such structure, if the counter 35 counts more than the prescribed number of pulses in the prescribed period, an output indicating incompatibility between the recording mode and the reproduction mode is provided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for reproducing a video signal using a rotatable head for reproducing including at least two heads which can be alternately changed over by means of a head changeover signal, from a magnetic recording medium in which four kinds of pilot signals are each sequentially recorded in each track in superposition on a video signal sequentially recorded in each recording track disposed adjacent to each other by a helical scan method, sequentially in each field either at relatively fast standard playing speed or at relatively slow long playing speed, comprising;

transferring means for transferring said magnetic recording medium, transfer speed changing means coupled to said transferring means for changing a transfer speed of said magnetic recording medium to either the standard playing speed or the long playing speed so as to adapt the reproducing speed to the speed at which the video signal was recorded, reproduced pilot signal generating means coupled to said rotatable head for reproducing for extracting said pilot signals from the signal reproduced by said rotatable head for providing reproduced pilot signals, reference signal generating means for sequentially providing four types of reference signals having different frequencies in response to said head changeover signal of at least two heads, said four types of reference signal being selected in the frequencies equal to those of said four types of pilot signals, comparing signal generating means coupled to said reproduced pilot signal generating means and said reference signal generating means for mixing said reproduced pilot signal and said reference signal for providing a comparing signal for detecting the level of said beat signal, tracking signal generating means coupled to said comparing signal generating means for generating the tracking signal responsive to the comparing output of said comparing signal generating means, fundamental cycle detecting means coupled to said tracking signal generating means for detecting a fundamental cycle of a comparing signal provided by said generating means, counting means coupled to said fundamental cycle detecting means for counting said detected output, time measuring means coupled to said counting means for measuring a prescribed period of time after said counting means starts counting, and recording speed detecting means coupled to said counting means, said time measuring means and said transferring speed changing means for determining a recording speed of said recording medium based on an output of said time measuring means when said time measuring means measures said prescribed period of time, whereby a selection signal is supplied to said transferring speed selecting means.

2. An apparatus for reproducing a video signal in accordance with claim 1, wherein said counting means provides a count-up output when a predetermined value is counted, and said recording speed determining means comprises count-up detecting means for detecting a recording speed based on said count-up output.

3. An apparatus for reproducing a video signal apparatus in accordance with claim 1, wherein said recording speed determining means comprises count value determining means for determining whether a value counted by said counting means is larger than said predetermined value or not.

4. An apparatus for reproducing a video signal in accordance with claim 2, wherein said time measuring means comprises a frequency dividing circuit for providing a frequency divided output of said head changeover signal.

5. An apparatus for reproducing a video signal in accordance with claim 1, wherein said fundamental cycle detecting means comprises:
    means for shaping said tracking signal,
    means for frequency dividing said head changeover signal, and
    a flip-flop responsive to an output of said frequency dividing means and an output of said shaping means.

* * * * *